(12) United States Patent
Maeda et al.

(10) Patent No.: US 12,531,304 B2
(45) Date of Patent: Jan. 20, 2026

(54) ELECTRICITY STORAGE DEVICE AND INSULATING HOLDER

(71) Applicant: SANYO Electric Co., Ltd., Osaka (JP)

(72) Inventors: Hitoshi Maeda, Hyogo (JP); Mitsuhiro Okada, Hyogo (JP); Hiroshi Takabayashi, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 702 days.

(21) Appl. No.: 17/777,859

(22) PCT Filed: Nov. 12, 2020

(86) PCT No.: PCT/JP2020/042222
§ 371 (c)(1),
(2) Date: May 18, 2022

(87) PCT Pub. No.: WO2021/100596
PCT Pub. Date: May 27, 2021

(65) Prior Publication Data
US 2022/0407166 A1 Dec. 22, 2022

(30) Foreign Application Priority Data
Nov. 20, 2019 (JP) ................. 2019-209363

(51) Int. Cl.
*H01M 50/244* (2021.01)
*H01M 50/186* (2021.01)
*H01M 50/593* (2021.01)

(52) U.S. Cl.
CPC ....... *H01M 50/244* (2021.01); *H01M 50/186* (2021.01); *H01M 50/593* (2021.01)

(58) Field of Classification Search
CPC ............. H01M 50/244; H01M 50/186; H01M 10/0585; H01M 50/466; H01M 50/474;
(Continued)

(56) References Cited

U.S. PATENT DOCUMENTS 9,893,338 B2 * 2/2018 Kwak ................. H01M 50/469
2011/0236750 A1 9/2011 Kohno et al.
(Continued)

FOREIGN PATENT DOCUMENTS

CN 110265725 A * 9/2019 ........ H01M 10/0587
EP 2866279 A1 4/2015
(Continued)

OTHER PUBLICATIONS

Translated JP-2014199780-A (Year: 2014).*
(Continued)

*Primary Examiner* — James M Erwin
*Assistant Examiner* — Sarah Arimintia Applegate
(74) *Attorney, Agent, or Firm* — Rimon P.C.

(57) ABSTRACT

An electricity storage device includes: an electrode body including at least one positive electrode plate, at least one negative electrode plate, and a separator. an insulating holder that is formed by folding a sheet made of an insulating material and accommodates therein the electrode body; an outer case which has an opening and accommodates therein the electrode body with the insulating holder and an electrolyte; and a sealing plate. The outer case has a bottom plate part and a plurality of side walls standing from the bottom plate part, and the opening is formed in a position to face the bottom plate part. The insulating holder has a plurality of side surface parts respectively facing the plurality of side walls, and a bottom surface part that faces the bottom plate part. At least one of the side surface parts or the bottom surface part has a bellow-folded structure.

7 Claims, 6 Drawing Sheets

(58) Field of Classification Search
CPC ............. H01M 50/477; H01M 50/486; H01M 10/052; H01M 50/593; H01G 11/82
See application file for complete search history.

(56) References Cited

U.S. PATENT DOCUMENTS

| | | | |
|---|---|---|---|
| 2013/0224632 A1* | 8/2013 | Roumi | ................... H01M 8/02 29/623.1 |
| 2015/0295217 A1 | 10/2015 | Kwak et al. | |
| 2017/0047571 A1 | 2/2017 | Iwasaki et al. | |
| 2019/0036088 A1 | 1/2019 | Wakimoto | |

FOREIGN PATENT DOCUMENTS

| | | | |
|---|---|---|---|
| JP | 2013-114940 A | | 6/2013 |
| JP | 2014-199782 A | | 10/2014 |
| JP | 2014199780 A | * | 10/2014 |
| JP | 2015-204292 A | | 11/2015 |
| JP | 2019-029218 A | | 2/2019 |
| JP | 2019-121496 A | | 7/2019 |
| JP | 2020-098688 A | | 6/2020 |

OTHER PUBLICATIONS

Translated CN-110265725-A (Year: 2019).*
Machine translation of JP-2014199780-A (Year: 2014).*
Dictionary definition of coupled (https://www.merriam-webster.com/dictionary/coupled) (Year: 2009).*
Machine translation CN-110265725-A (Year: 2019).*
Machine translation JP-2014199780-A (Year: 2014).*
JP-2014199780-A (Machine Translation) (Year: 2014).*
Indian Office Action dated Sep. 22, 2022 issued in the corresponding Indian Patent Application No. 202247031110, with English translation.
Hearing Notice dated Mar. 11, 2024 issued in the corresponding Indian Patent Application No. 202247031110, with English translation.
International Search Report issued in International Patent Application No. PCT/JP2020/042222, dated Jan. 19, 2021, with English translation.
Extended European Search Report dated Mar. 23, 2023 issued in the corresponding European Patent Application No. 20890960.6.
Office Action received in corresponding European Patent Application No. 20 890 960.6, dated Oct. 23, 2025.

* cited by examiner

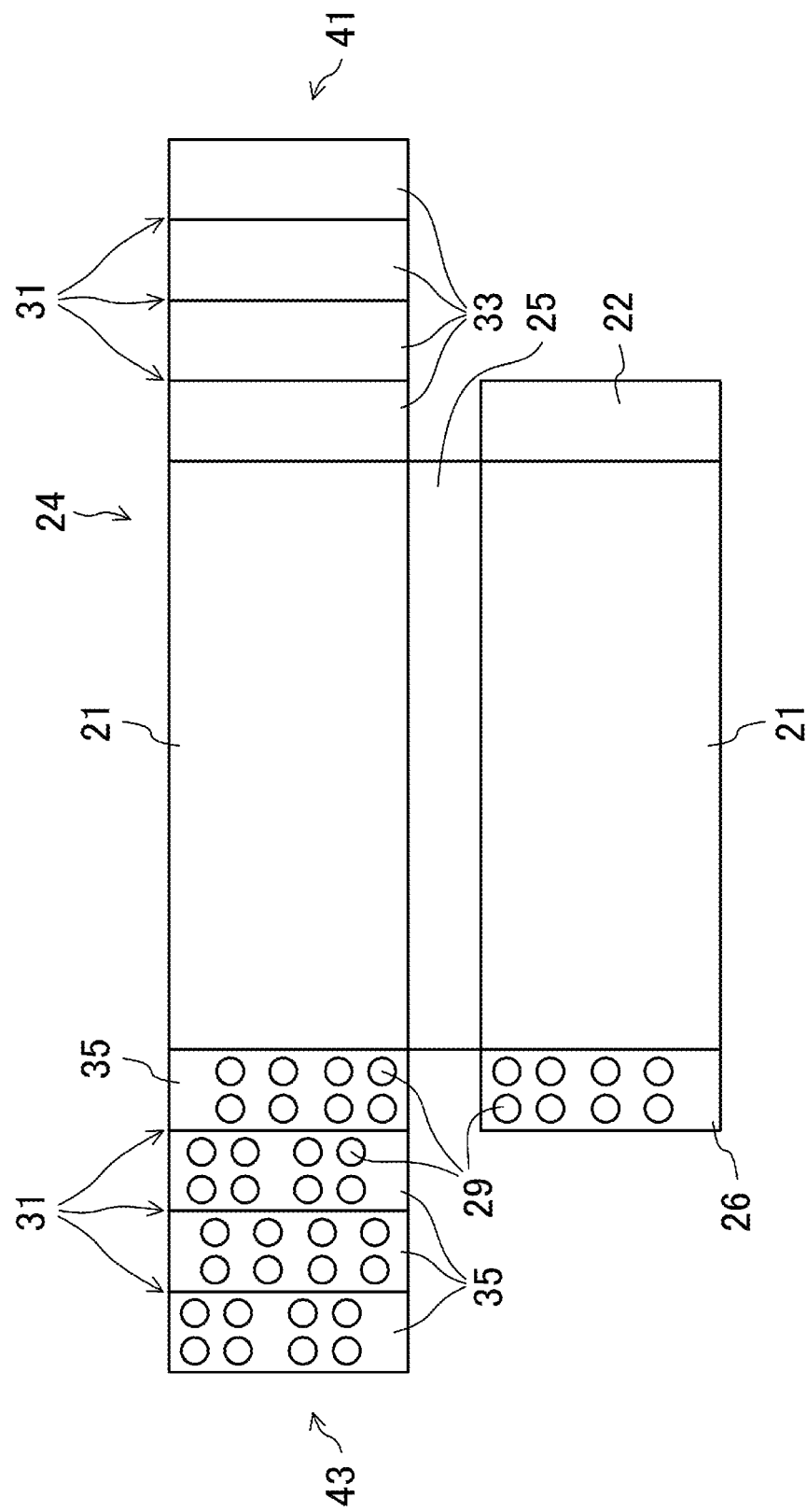

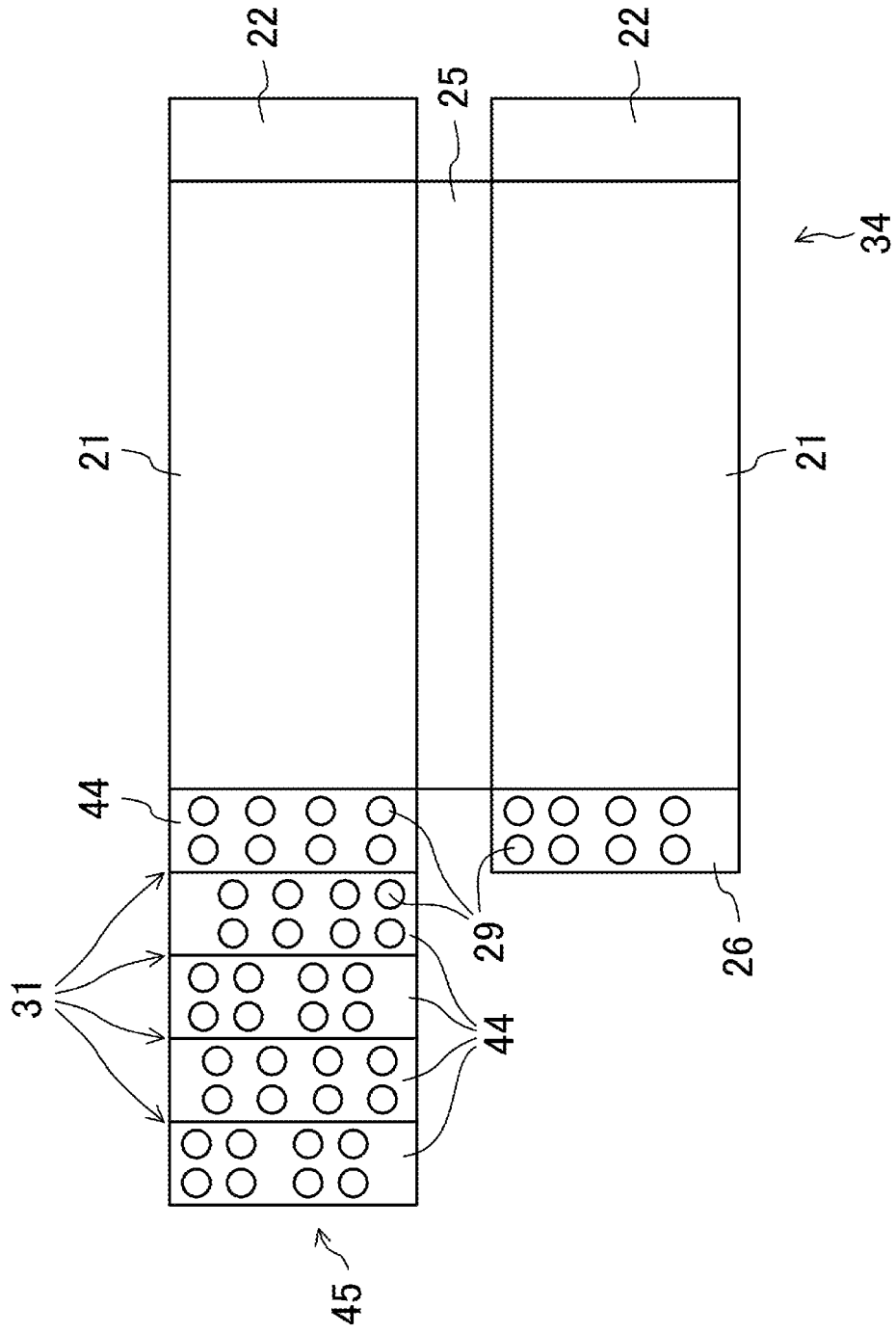

ELECTRICITY STORAGE DEVICE AND INSULATING HOLDER

CROSS-REFERENCE OF RELATED APPLICATIONS

This application is the U.S. National Phase under 35 U.S.C. § 371 of International Patent Application No. PCT/JP2020/042222, filed on Nov. 12, 2020, which in turn claims the benefit of Japanese Patent Application No. 2019-209363, filed on Nov. 20, 2019, the entire disclosures of which Applications are incorporate by reference herein.

TECHNICAL FIELD

The present disclosure relates to an electricity storage device and an insulating holder.

BACKGROUND

Electricity storage devices such as secondary batteries and capacitors are used as power sources for driving vehicles such as electric vehicles (EV) and hybrid electric vehicles (HEV). In such electricity storage devices, a metal case made of aluminum or the like may be used as the outer case for the sake of mechanical strength and the like, in which case a positive electrode and a negative electrode in an electrode body may be short-circuited when the metal case and the electrode body accommodated in the metal case contact with each other. To avoid this short-circuiting, the electrode body is accommodated in a bag-like insulating holder and the electrode body, along with the insulating holder, is accommodated in the metal case, thereby interposing the insulating holder between the electrode body and the metal case. With the insulating holder interposed, the metal case and the electrode body are kept from contacting each other, and therefore short-circuiting is avoided.

For example, Patent Document 1 discloses an insulating holder that is accommodated in an outer case while accommodating an electrode body in the insulating holder, such that the insulating holder keeps stress within the electrode body from being concentrated, in a case where a corner portion of the insulating holder contacts a curved surface in a corner portion of the outer case.

Further, Patent Document 2 discloses an electricity storage element positioned between an electrode body and an inner wall of an accommodating container, the electricity storage element including a press-contact member having a rising portion to press-contact an electrode body with its elasticity while it is impregnated with electrolytic solution, and indicates that the electrode body is stably retained without swaying even if the electricity storage element is subject to an impact or vibration.

Patent Document 3 discloses that a bottom retainer having a contact portion to contact a bottom surface of a case is formed, and that the bottom retainer has a support part that supports an electrode assembly so as to enable maintaining of a tensioned state.

CITATION LIST

Patent Documents

PATENT DOCUMENT 1: Japanese Unexamined Patent Publication No. 2019-29218
PATENT DOCUMENT 2: Japanese Unexamined Patent Publication No. 2014-199782
PATENT DOCUMENT 3: Japanese Unexamined Patent Publication No. 2015-204292

SUMMARY OF THE INVENTION

Unlike Patent Document 1, Patent Document 2 and 3 do not disclose an insulating holder that retains insulation between the side surfaces of an electrode body or an electrode assembly and the case. However, it is preferable to provide an insulating holder to reliably avoid short-circuiting caused by the electrode body contacting the case.

However, providing an insulating holder to the battery of Patent Document 2 and 3 necessitates two members that are an insulating holder and a press-contact member or a bottom retainer, which consequently leads to a problem of an increased cost.

An electricity storage device of the present disclosure includes: an electrode body including at least one positive electrode plate, at least one negative electrode plate, and a separator interposed between the at least one positive electrode plate and the at least one negative electrode plate being stacked. an insulating holder that is formed by folding a sheet made of an insulating material and accommodates therein the electrode body; an outer case which has an opening and accommodates therein the electrode body along with the insulating holder and an electrolyte; and a sealing plate that seals the opening. The outer case has a bottom plate part and a plurality of side walls standing from the bottom plate part, and the opening is formed in a position to face the bottom plate part. The insulating holder has a plurality of side surface parts respectively facing the plurality of side walls, and a bottom surface part that faces the bottom plate part. At least one of the side surface parts or the bottom surface part has a bellow-folded structure. Here, the bellow-folded structure is a folded structure to form a series of mountain-folded and valley folded parts parallel to one another with an equal width.

The bottom surface part may have the bellow-folded structure.

Mountains in the bellow-folded structure may count two or more but not more than eight. Here, the number of mountains in the bellow-folded structure is the number of mountain folds and valley folds. In a case where the bellow-folded part is continuous with other flat surface parts, a fold forming the boundary is not included in the number of mountains.

A portion of the sheet having the bellow-folded structure may have a plurality of holes. Further, in two regions of the sheet having the bellow-folded structure, which regions face each other when the sheet is folded, each of the holes formed in one of the regions faces a portion of the other region having no hole in a preferred embodiment.

An insulating holder of the present disclosure is formed by folding a sheet made of an insulating material. The insulating holder includes a bottom surface part and a plurality of side surface parts standing from the bottom surface part. At least one of the side surface parts or the bottom surface part has a bellow-folded structure.

An electricity storage device of the present disclosure includes an insulating holder having a bellow-folded structure in at least one of side surface parts or bottom surface part of the insulating holder. Therefore, an electrode body is reliably kept from contacting the outer case at a low cost.

BRIEF DESCRIPTION OF THE DRAWINGS

FIG. 6 is an unfolded view of an insulating holder according to another embodiment.

FIG. 7 is an unfolded view of an insulating holder according to yet another embodiment.

DESCRIPTION OF EMBODIMENT

Figure 1:
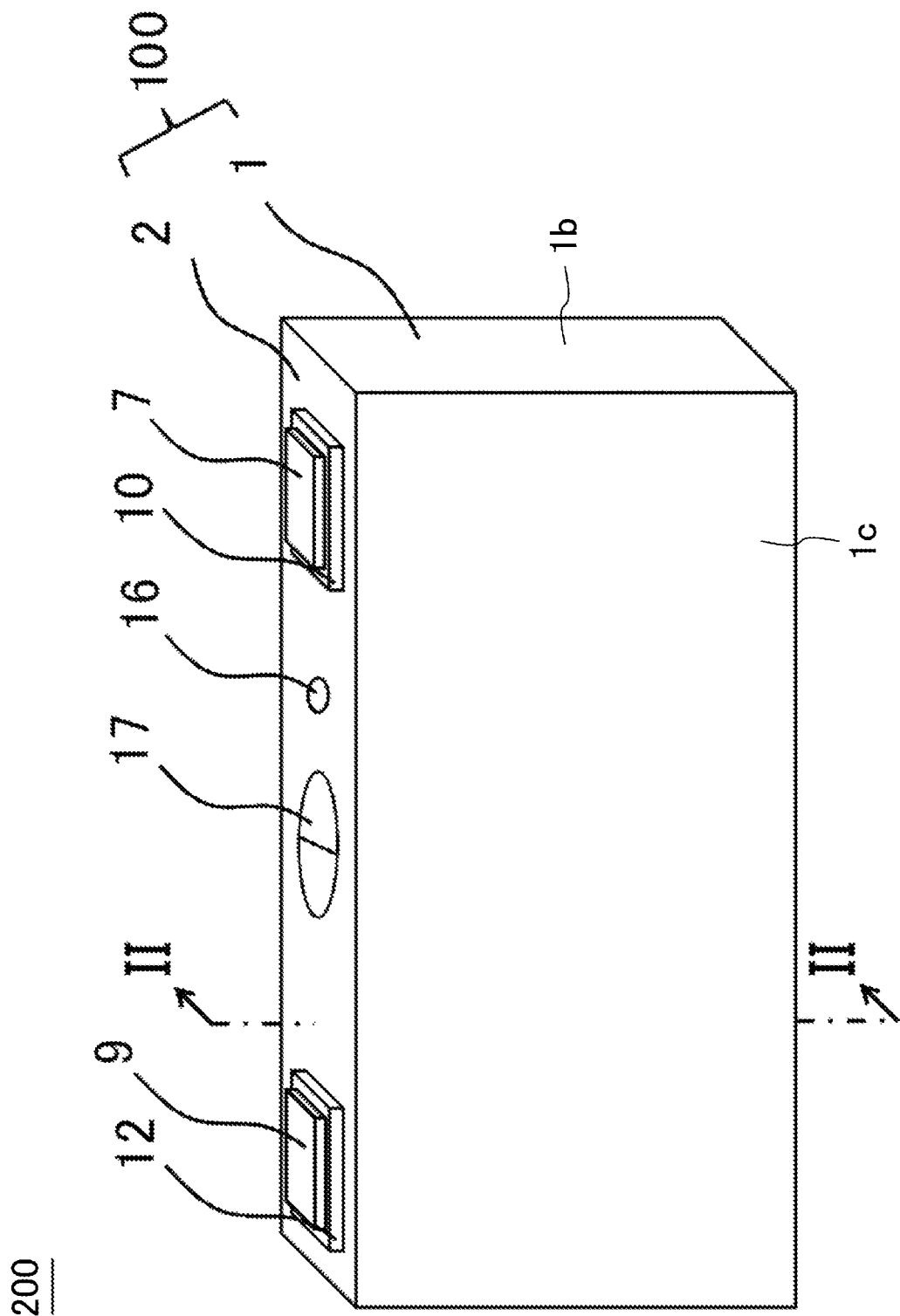
FIG. 1 is a schematic external perspective view of a secondary battery according to an embodiment.

Hereinafter, an embodiment of the present disclosure will be described in detail with reference to the drawings. The following description of the preferred embodiment is only an example in nature, and is not intended to limit the scope, applications or use of the present disclosure. For the sake of simple description, constituting elements having substantially the same function are given the same reference characters in the following description. Note that the embodiment described below deals with an electricity storage device as a single unit. However, a plurality of electricity storage devices each as a single unit may be connected to each other serially or in parallel and used as a so-called battery pack for machinery and the like, such as an EV, that requires electricity storage equipment capable of a high output and having a large capacity.

First Embodiment

The following describes a structure of a rectangular secondary battery 200 as a secondary battery (electricity storage device) of the first embodiment. Note that the present disclosure is not limited to the following embodiment.

Figure 2:
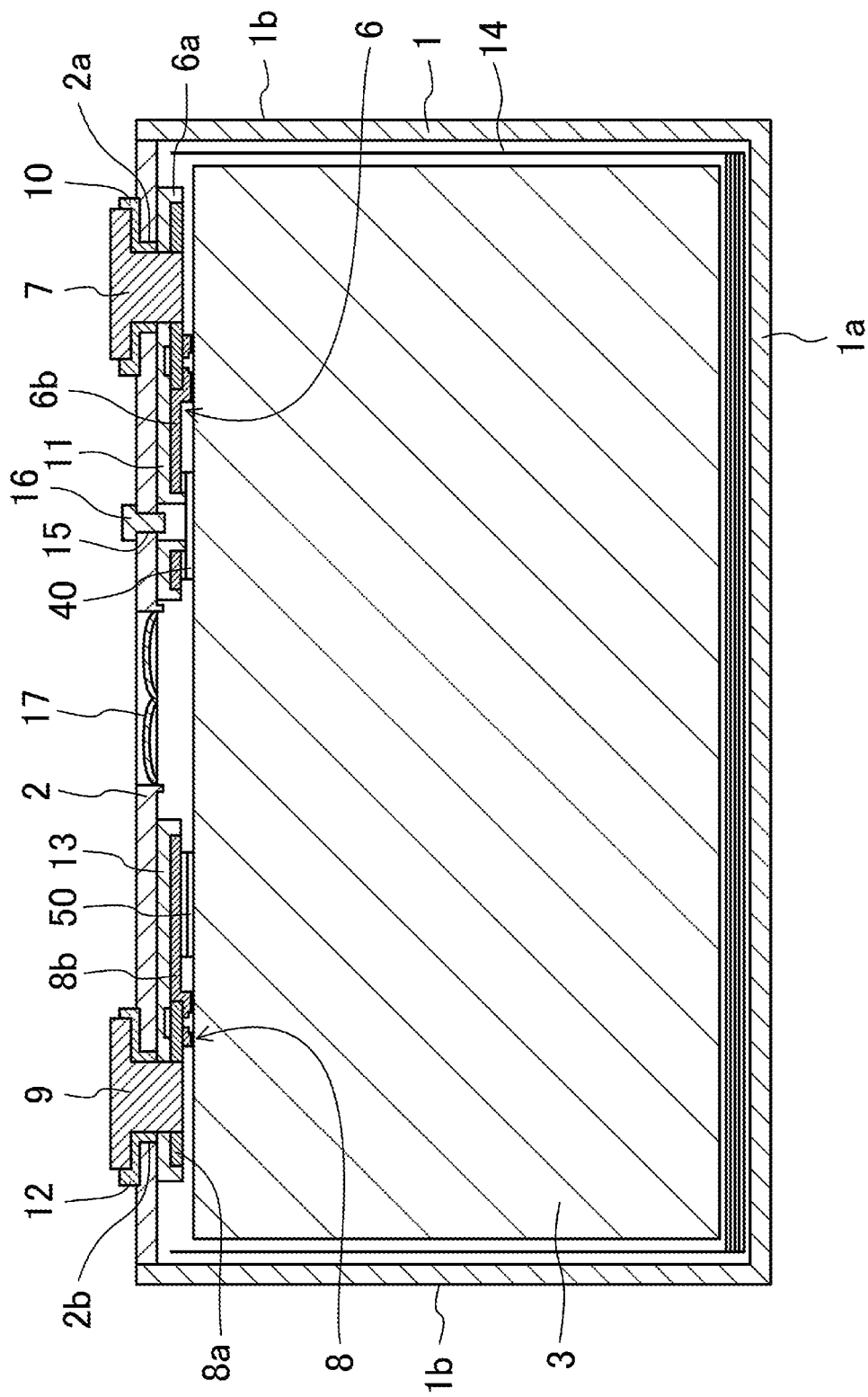
FIG. 2 is a cross-sectional view taken along line II-II of FIG. 1.

As shown in FIG. 1 and FIG. 2, the rectangular secondary battery 200 includes a battery case 100 having an outer case 1 having a shape like a rectangular tube with a bottom and an opening, and a sealing plate 2 sealing the opening of the outer case 1. The outer case 1 and the sealing plate 2 are each made of a metal in a preferred embodiment. The outer case 1 has a bottom plate part 1a facing the sealing plate 2, and four side walls 1b and 1c standing up from the bottom plate part 1a. These side walls 1b and 1c are two narrower side walls 1b facing each other and two wide side walls 1c facing each other, and the narrow side walls 1b are positioned between sides of the two wide side walls 1c. In the outer case 1, an electrode body 3 having a positive electrode plate and a negative electrode plate are accommodated together with an electrolyte. In the present embodiment, the electrolyte is in a liquid form.

An end portion of the electrode body 3 on the side of the sealing plate 2 has a positive electrode tab group 40 including a plurality of positive electrode tabs and a negative electrode tab group 50 including a plurality of negative electrode tabs. The positive electrode tab group 40 is electrically connected to a positive electrode terminal 7 via a first positive electrode current collector 6a and a second positive electrode current collector 6b (collectively positive electrode current collector 6). The negative electrode tab group 50 is electrically connected to a negative electrode terminal 9 via a first negative electrode current collector 8a and a second negative electrode current collector 8b (collectively negative electrode current collector 8).

The first positive electrode current collector 6a, the second positive electrode current collector 6b, and the positive electrode terminal 7 are made of preferably metal, more preferably aluminum or an aluminum alloy. Between the positive electrode terminal 7 and the sealing plate 2, a resin-made outer side insulation member 10 is arranged. Between the sealing plate 2 and the first positive electrode current collector 6a and the second positive electrode current collector 6b, a resin-made inner side insulation member 11 is arranged.

The first negative electrode current collector 8a, the second negative electrode current collector 8b, and the negative electrode terminal 9 are made of preferably metal, more preferably copper or a copper alloy. Further, the negative electrode terminal 9 has a portion made of aluminum or an aluminum alloy and a portion made of a copper or a copper alloy in a preferred embodiment. In this case, the portion made of copper or a copper alloy is connected to the first negative electrode current collector 8a, and the portion made of the aluminum or an aluminum alloy protrudes further outward than the sealing plate 2, in a preferred embodiment. Between the negative electrode terminal 9 and the sealing plate 2, a resin-made outer side insulation member 12 is arranged. Between the sealing plate 2 and the first negative electrode current collector 8a and the second negative electrode current collector 8b, a resin-made inner side insulation member 13 is arranged.

Between the electrode body 3 and the outer case 1, an insulating holder 14 made of a resin-made insulation sheet is arranged. The insulating holder 14 is formed by bending the resin-made insulation sheet in a box-like shape. The insulating holder 14 maintains a state in which the electrode body 3 and the outer case 1 are reliably electrically insulated from each other. The insulating holder 14 is detailed later.

The sealing plate 2 is provided with an electrolyte liquid injection hole 15, and the electrolyte liquid injection hole 15 is sealed with a sealing member 16. The sealing plate 2 is provided with a gas discharge valve 17 that breaks when the pressure inside the battery case 100 reaches or surpasses a predetermined value to discharge the gas inside the battery case 100 to the outside of the battery case 100.

Next, the following describes a method of manufacturing the rectangular secondary battery 200 and details of each structure.

[Positive Electrode Plate]

First, a method for manufacturing a positive electrode plate will be described.

[Preparation of Positive Electrode Active Material Mixture Layer Slurry]

Lithium nickel cobalt manganese composite oxide as a positive electrode active material, polyvinylidene fluoride (PVdF) as a binder, a carbon material as a electroconductive material, and N-methyl-2-pyrrolidone (NMP) as a dispersion medium are kneaded at a mass ratio of lithium nickel cobalt manganese composite oxide:PVdF:carbon material of 97.5:1: 1.5. Thus, a positive electrode active material mixture layer slurry is prepared.

[Preparation of Positive Electrode Protective Layer Slurry]

An alumina powder, graphite as an electroconductive material, polyvinylidene fluoride (PVdF) as a binder, and N-methyl-2-pyrrolidone (NMP) as a dispersion medium are kneaded at a mass ratio of alumina powder:graphite:PVdF of 83:3:14. Thus, a protective layer slurry is prepared.

[Formation of Positive Electrode Active Material Mixture Layer and Positive Electrode Protective Layer]

To both surfaces of an aluminum foil having a thickness of 15 μm as a positive electrode core, the positive electrode active material mixture layer slurry and the positive electrode protective layer slurry produced as described above are applied using a die coater. At this time, the positive electrode active material mixture layer slurry is applied to a width-directionally middle of the positive electrode core. Further, the positive electrode protective layer slurry is applied to width-directionally both ends of the region where the positive electrode active material mixture layer slurry is applied.

The positive electrode core with the positive electrode active material mixture layer slurry and the positive electrode protective layer slurry applied thereon is dried and to remove NMP in the slurries. In this way, the positive electrode active material mixture layer and the protective layer are formed. Thereafter, the positive electrode active material mixture layer is compressed by passing it between a pair of press rollers to form a positive electrode pre-cut plate. The positive electrode pre-cut plate is then cut into a predetermined size to complete a positive electrode plate. The positive electrode plate has such a shape that a positive electrode tab protrudes from one end of the rectangular positive electrode core, and that the positive electrode active material mixture layer is formed in the rectangular portion of the positive electrode core.

[Negative Electrode Plate]

Next, a method for manufacturing a negative electrode plate will be described.

[Preparation of Negative Electrode Active Material Mixture Layer Slurry]

Graphite as a negative electrode active material, styrene-butadiene rubber (SBR) and carboxymethyl cellulose (CMC) as a binder, and water as a dispersion medium are kneaded at a mass ratio of graphite:SBR:CMC of 98:1:1. Thus, a negative electrode active material mixture layer slurry is prepared.

[Formation of Negative Electrode Active Material Mixture Layer]

To both surfaces of a copper foil having a thickness of 8 μm as a negative electrode core, the negative electrode active material mixture layer slurry produced as described above is applied using a die coater.

The negative electrode core with the negative electrode active material mixture layer slurry applied thereon is dried to remove water in the slurry. In this way, the negative electrode active material mixture layer is formed. Thereafter, the negative electrode active material mixture layer is compressed by passing it between a pair of press rollers to form a negative electrode pre-cut plate. The negative electrode pre-cut plate is then cut into a predetermined size to complete a negative electrode plate. The negative electrode plate has such a shape that a negative electrode tab protrudes from one end of the rectangular negative electrode core, and that the negative electrode active material mixture layer is formed in the rectangular portion of the negative electrode core.

[Production of Electrode Body]

The positive electrode plate and the negative electrode plate produced in the method described above are stacked with a separator therebetween, to form a stacked-type electrode body 3. An end portion of the electrode body 3 has the positive electrode tab group 40 including a plurality of positive electrode tabs and the negative electrode tab group 50 including a plurality of negative electrode tabs.

[Connection Between Current Collector and Tab]

The positive electrode tab group 40 of the electrode body 3 is connected to the second positive electrode current collector 6b, and the negative electrode tab group 50 of the electrode body 3 is connected to the second negative electrode current collector 8b. To connect these members, ultrasonic welding, resistance welding, laser welding, or the like may be adopted.

[Attachment of Components to Sealing Plate]

The outer side insulation member 10 is arranged on a battery outer surface side around a positive electrode terminal insertion hole 2a of the sealing plate 2. The inner side insulation member 11 and the first positive electrode current collector 6a are arranged on a battery inner surface side around the positive electrode terminal insertion hole 2a of the sealing plate 2. Then, the positive electrode terminal 7 is inserted, from the battery outer side, into a through hole of the outer side insulation member 10, the positive electrode terminal insertion hole 2a of the sealing plate 2, a through hole of the inner side insulation member 11, and a terminal connection hole of the first positive electrode current collector 6a. Then, the distal end of the positive electrode terminal 7 is crimped to the first positive electrode current collector 6a. As a result, the positive electrode terminal 7 and the first positive electrode current collector 6a are fixed to the sealing plate 2. Note that the crimped portion of the positive electrode terminal 7 and the first positive electrode current collector 6a are welded together in a preferred embodiment.

The outer side insulation member 12 is arranged on the battery outer surface side around a negative electrode terminal insertion hole 2b of the sealing plate 2. The inner side insulation member 13 and the first negative electrode current collector 8a are arranged on the battery inner surface side around the negative electrode terminal insertion hole 2b of the sealing plate 2. Then, the negative electrode terminal 9 is inserted, from the battery outer side, into a through hole of the outer side insulation member 12, the negative electrode terminal insertion hole 2b of the sealing plate 2, a through hole of the inner side insulation member 13, and a terminal connection hole of the first negative electrode current collector 8a. Then, the distal end of the negative electrode terminal 9 is crimped to the first negative electrode current collector 8a. As a result, the negative electrode terminal 9 and the first negative electrode current collector 8a are fixed to the sealing plate 2. Note that the crimped portion of the negative electrode terminal 9 and the first negative electrode current collector 8a are welded together in a preferred embodiment.

A liquid injection port is provided in a portion of the inner side insulation member 11, which faces the electrolyte liquid injection hole 15 provided to the sealing plate 2. Further, a tubular portion is provided at the rim of the liquid injection port.

[Connection Between First Current Collector and Second Current Collector]

The second positive electrode current collector 6b connected to the positive electrode tab group 40 is arranged on the inner side insulation member 11 so that the second positive electrode current collector 6b partially overlaps the first positive electrode current collector 6a. Then, laser is applied to a thin portion of the second positive electrode current collector 6b to weld-connect between the second positive electrode current collector 6b and the first positive electrode current collector 6a. Further, the second negative electrode current collector 8b connected to the negative electrode tab group 50 is arranged on the inner side insulation member 13 so that the second negative electrode current collector 8b partially overlaps the first negative electrode current collector 8a. Then, laser is applied to a thin portion of the second negative electrode current collector 8b to weld-connect the second negative electrode current collector 8b to the first negative electrode current collector 8a.

[Production of Secondary Battery]

The electrode body 3 attached to the sealing plate 2 is accommodated in the insulating holder 14 made of an insulation sheet formed in a box-like shape.

The electrode body 3 accommodated in the insulating holder 14 is inserted into the outer case 1. Then, the sealing plate 2 and the outer case 1 are welded and the opening of the outer case 1 is sealed by the sealing plate 2. Then, through the electrolyte liquid injection hole 15 provided to the sealing plate 2, an electrolyte is injected into the outer case 1. After that, the electrolyte liquid injection hole 15 is sealed by a sealing member such as a blind rivet or the like. Thus, a rectangular secondary battery 200 is completed.

<Insulating Holder>

Figure 3:
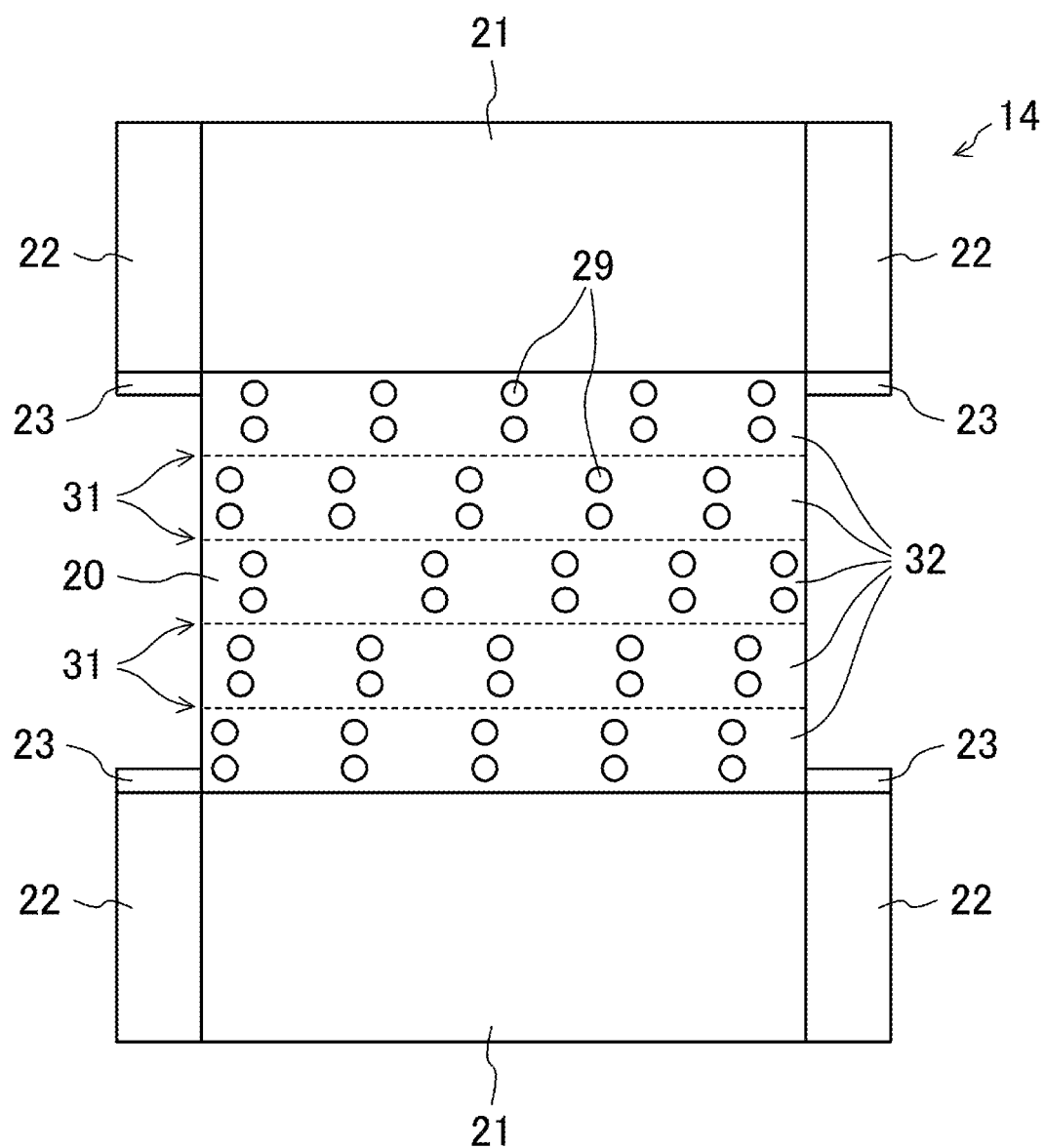
FIG. 3 is an unfolded view of an insulating holder according to the embodiment.

FIG. 3 shows a state in which the resin sheet constituting the insulating holder 14 of the present embodiment is unfolded (before being folded). The resin sheet constituting the insulating holder 14 is made of an electrolyte-resistant resin, such as polyester, polypropylene, or polyethylene, with a thickness of 20 μm to 100 μm, in a preferred embodiment. The insulating holder 14 may be a nonwoven or woven fabric made of polyester, polypropylene, polyethylene, or the like.

Figure 4:
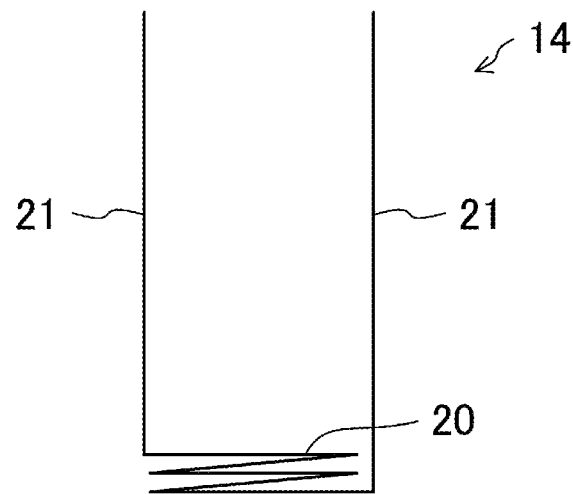
FIG. 4 is a schematic cross-sectional view parallel to a narrow side surface part of the insulating holder according to the embodiment.

The insulating holder 14 of the present embodiment has a bottom surface part 20 that faces the bottom plate part 1a of the outer case 1 and that has a bellow-folded structure. The bellow-folded structure is a zigzag folded structure formed by folding a sheet or thin plate material so as to form a series of mountain-folded and valley folded parts parallel to one another with an equal width. The number of mountains 31 of the bellow-folded structure of the bottom surface part 20 is four in the present embodiment. Specifically, the number of mountains is the number of mountain folds and valley folds. In a case where the bellow-folded part is continuous with other flat surface parts (wide side surface parts 21 of the insulating holder 14 in this case), a fold forming the boundary is not included in the number of mountains. As shown in FIG. 4, the bottom surface part 20 has a zigzag shape, and the number of mountains is four. Thus, five overlapping sheet pieces 32, 32, . . . are folded and overlapped.

Figure 5:
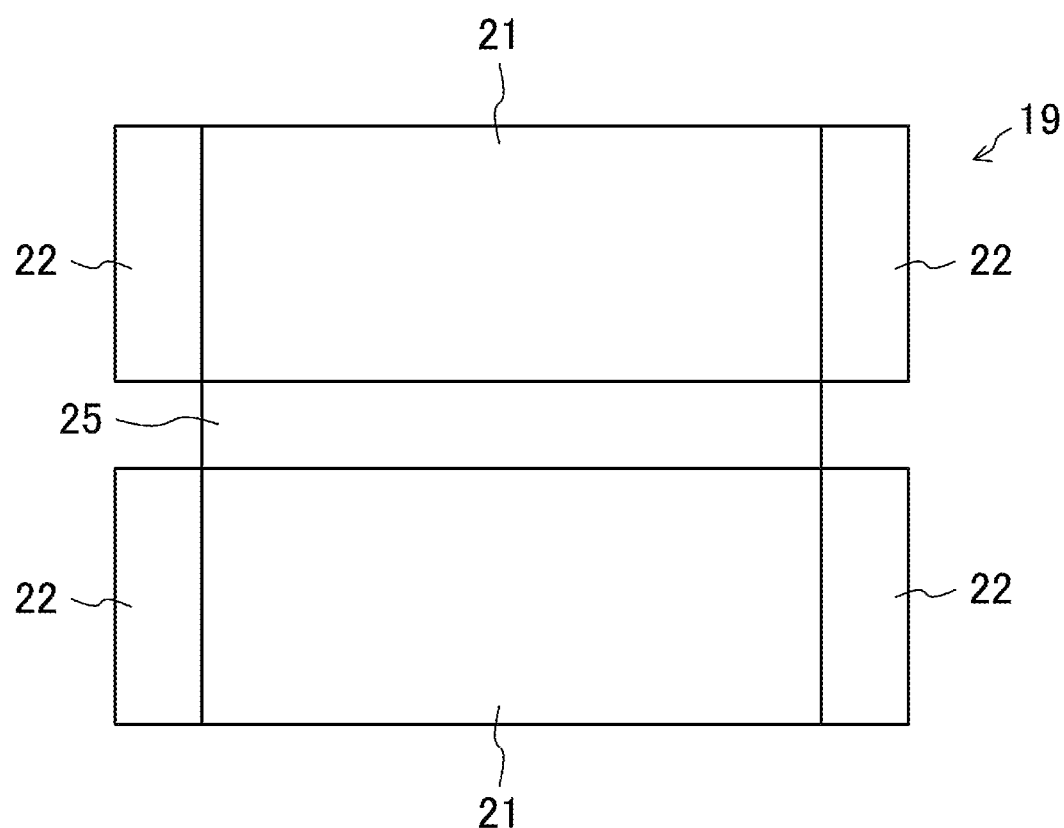
FIG. 5 is an unfolded view of an insulating holder of a comparative example.

On the other hand, FIG. 5 shows an insulating holder 19 as a comparative example which is structured by a single flat sheet, and the entire surface of the insulating holder 19 does not have a bellow-folded structure.

Five overlapping sheet pieces 32, 32, . . . are overlapped to form the bottom surface part 20 as shown in FIG. 4 in the present embodiment. Thus, the bottom surface part 20 of the insulating holder 14 is five times thicker than the bottom surface part 25 of the insulating holder 19 of the comparative example, and achieves a favorable cushioning. The present embodiment assumes that the rectangular secondary battery 200 is used with the bottom plate part 1a downward, and the bottom surface part 20 with the favorable cushioning is supposed to support the under surface of the electrode body 3. Therefore, damages to the electrode body 3 due to vibration or the like can be avoided.

Although a method of forming the bellow-folded structure of the insulating holder 14 of the present embodiment is not particularly limited, the bellow-folded structure can be formed as follows, for example.

First, a resin sheet is cut in a predetermined shape as shown in FIG. 3. At this time, a plurality of holes 29, 29, . . . in the bottom surface part 20 are formed. Next, a corner of a hard member made of a metal or the like is pressed against the resin sheet to form a fold line. Then, an end portion of a metal piece or a rod-like object is pressed against the fold line to give the resin sheet a crease. Then, the resin sheet is folded and pressed to form a bellow-folded structure. Then, the wide side surface parts 21, 21 . . . and a narrow side surface parts 22, 22, . . . are folded to form a rectangular tube-like insulating holder 14. On the side of the bottom surface part 20 of the narrow side surface parts 22, 22, the thickness of the bottom surface part 20 is significantly thicker than that of the insulating holder 19 of the comparative example, due to the bellow-folded structure. Due to this, the lengths on the side of the bottom surface part of the narrow side surface parts 22, 22, . . . are insufficient, and supplement parts 23, 23 . . . are provided to supplement this insufficient lengths.

Further, a plurality of holes 29, 29, . . . are formed in the five overlapping sheet pieces 32, 32, . . . . These holes 29, 29, . . . are for passing an electrolyte therethrough. In two sheet pieces 32, 32 (two regions of the resin sheet) facing each other, the hole 29 formed in one sheet piece 32 faces a portion of the other sheet piece 32 where the hole 29 is not formed (faces a portion other than the hole 29, i.e., faces the material of the sheet).

Specifically, in two sheet pieces 32, 32 directly overlapped with each other, the hole 29 in the upper sheet piece 32 is formed in a different position from that of the hole 29 in the lower sheet piece 32 in the in-plane direction of the sheet pieces 32 so that the holes of the upper and lower sheet pieces 32, 32 are not in communication with each other in a perpendicular direction to the sheet pieces 32. This structure keeps the electrode body 3 from contacting the outer case 1 through the holes 29, 29, . . . , and therefore short-circuiting can be avoided. Further, the electrolyte on the bottom side of the outer case 1 can easily flow through the bottom surface part 20 and liquid circulation of the electrolyte can be improved. Further, a larger amount of electrolyte can be retained in the part of the bellow-folded structure of the bottom surface part 20.

The insulating holder 14 of the present embodiment brings about an effect that appears to be brought about by a combination of the insulating holder 19 of the comparative example with the press-contact member of Patent Document 2 or the bottom retainer of Patent Document 3, and a single member can bring about an effect brought about by two members.

Second Embodiment

A secondary battery according to the second embodiment is different from the secondary battery 20 of the first embodiment only in the structure of the insulating holder. The following describes only the different part of the structure.

FIG. 6 shows a state in which the resin sheet constituting the insulating holder 24 of the present embodiment is unfolded (before being folded). In the present embodiment, the bellow-folded structure is provided to the narrow side surface parts 41, 43, instead of the bottom surface part 25. The bellow-folded structure is provided to two narrow side surface parts 41, 43 facing each other across a single wide side surface part 21. There are three mountains 31 in the bellow-folded structure of each of the narrow side surface parts 41, 43, and there are four overlapping sheet pieces 33, 33, . . . 35, 35, . . . on each side. The first embodiment deals with a case where the wide side surface parts 21, 21 are continuous on both sides of the bellow-folded structure. Thus, the number of overlapping sheet pieces 32, 32, . . . needs to be an odd number in order to have the wide side surface parts 21, 21 face each other when folded. However, in the present embodiment, one end side of the bellow-folded structure is not connected to anything. Thus, the number of the overlapping sheet pieces 33, 35 may be an odd number or an even number.

Of the bellow-folded structures provided to the two narrow side surface parts 41, 43, only the narrow side surface parts 43 on one side is provided with a plurality of holes 29, 29 . . . . Each of the holes 29 is positioned so as not to overlap another hole 29 when the overlapping sheet pieces 35, 35 are folded, as in the case of the first embodiment. Further, a plurality of holes 29, 29, . . . are also provided to a narrow side surface part 26 facing the narrow side surface part 43 having a plurality of holes 29, 29, . . . , across an area having no sheet. The present embodiment assumes that the secondary battery is used with a side wall part 1b, which faces the narrow side surface part 43, being at the bottom, and the narrow side surface part 43 with the favorable cushioning is supposed to support a side surface of the electrode body 3. Therefore, damages to the electrode body 3 due to vibration or the like can be avoided. Further, the electrolyte on the lower side can flow between the outer case 1 and the electrode body 3, through the plurality of holes 29, 29, . . . .

Further, while the secondary battery 20 of the first embodiment is such that the electrode body 3 is fixed by the sealing plate 2 on its upper surface side which is opposite to the bottom surface so as to protect the upper surface side of the electrode body 3 from vibration, the present embodiment protects both sides of the electrode body 3 by the narrow side surface parts 41, 43 having the bellow-folded structures. Therefore, damages to the electrode body 3 attributed to vibration in the up-down direction (longitudinal direction) can be avoided.

The secondary battery of the present embodiment may be installed with the bottom plate part 1a at the bottom, instead of having the side wall part 1b at the bottom, when being used. In a case of using the secondary battery of the present embodiment with its bottom plate part 1a at the bottom, the bellow-folded structures of the two narrow side surface parts 41, 43 protects the electrode body 3 from vibration in a lateral direction, and keeps the electrode body 3 from being damaged by such vibration.

Further, a plurality of holes can also be provided to the narrow side surface part 41 on the other side. For example, suppose that a plurality of the secondary batteries of the present embodiment are used as a battery pack. In such a case, to connect between the positive electrode terminals and the negative electrode terminals, the plurality of secondary batteries may be set so that the side wall part 1b facing the narrow side surface part 43 on one side and the side wall part 1b facing the narrow side surface part 41 on the other side are alternately facing downward. Alternatively, a plurality of the secondary batteries may be handled as one unit (block), and the side wall part 1b facing the narrow side surface part 43 on one side and the side wall part 1b facing the narrow side surface part 41 on the other side are alternated on a block-by-block basis. In these battery packs, a plurality of holes 29, 29, . . . are provided on both of the narrow side surface parts 41, 43, in a preferred embodiment.

In the present embodiment, the structures and shapes of the members of the secondary battery other than the insulating holder are the same as those of the first embodiment. As to these members, reference shall be made to the first embodiment, and no further description for these members is provided in this embodiment.

The secondary battery and the insulating holder of the second embodiment bring about the same effect as those brought about by the secondary battery and the insulating holder of the first embodiment.

Third Embodiment

A secondary battery according to the third embodiment is different from the secondary battery 20 of the first embodiment and the secondary battery of the second embodiment only in the structure of the insulating holder. The following describes only the different part of the structure.

FIG. 7 shows a state in which the resin sheet constituting the insulating holder 34 of the present embodiment is unfolded (before being folded). In the present embodiment, the bellow-folded structure is provided to a single narrow side surface part 45, instead of the bottom surface part 25. There are four mountains 31 in the bellow-folded structure of each of the narrow side surface part 45, and there are five overlapping sheet pieces 44, 44 . . . .

The present embodiment also assumes that the secondary battery is used with a side wall part 1b, which faces the narrow side surface part 45, being at the bottom. Further, in the present embodiment, a plurality of holes 29, 29, . . . are provided to the narrow side surface part 45 having the bellow-folded structure and a narrow side surface part 26 facing the narrow side surface part 45 across an area having no sheet. These holes 29, 29, . . . maintain favorable liquid circulation of the electrolyte, as in the case of the second embodiment.

The structures and shapes of the members of the secondary battery other than the insulating holder are the same as those of the first embodiment. As to these members, reference shall be made to the first embodiment, and no further description for these members is provided in this embodiment.

The secondary battery and the insulating holder of the third embodiment bring about the same effect as those brought about by the secondary battery and the insulating holder of the first embodiment. Although the upper side of the electrode body 3 of the secondary battery is less protective as compared to the secondary battery and insulating holder of the second embodiment, the protection on the lower side is the same.

OTHER EMBODIMENTS

The above-described embodiments are examples of the present disclosure, and the present disclosure is not limited to these examples. Well-known techniques, commonly used techniques, and publicly known techniques may be combined or partially replaced in these examples. Further, the present disclosure encompasses any modification easily conceivable by a person with ordinary skill in the art.

The electrode body is not limited to a stacked electrode body in which a plurality of positive electrode plates and a plurality of negative electrode plates are alternately stacked with separators interposed therebetween. The electrode body may be such that the positive electrode plate and the negative electrode plate interposing a separator therebetween are wound. In a case of such a wound electrode body, the winding axis of the electrode body may extend in the vertical direction or in the horizontal direction, while the sealing plate is positioned above. Further, a plurality of electrode bodies may be provided in a single electricity storage device. Further, the electricity storage device is not limited to a secondary battery, and may be a capacitor.

The insulating holder may be formed by folding a resin-made insulation sheet in a shape of a bag.

The number of mountains in the bellow-folded structure is two or more but not more than eight in a preferred embodiment. Considering the cushioning and easiness of production, the number of mountains is 4 or more but not more than 6 in a preferred embodiment.

The electrolyte to be used may be in a liquid form or a solid form.

DESCRIPTION OF REFERENCE CHARACTERS

1 Outer Case
1a Bottom Plate Part
1b, 1c Side Wall Part
2 Sealing Plate
3 Electrode Body
14 Insulating Holder
Bottom Surface Part
21,22 Side Surface Part
24 Insulating Holder
Bottom Surface Part
29 Hole
31 Mountain
34 Insulating Holder

The invention claimed is:

1. An electricity storage device, comprising:
an electrode body including at least one positive electrode plate, at least one negative electrode plate, and a separator interposed between the at least one positive electrode plate and the at least one negative electrode plate being stacked;
an insulating holder that is formed by folding a single sheet made of an insulating material and accommodates therein the electrode body;
an outer case which has an opening and accommodates therein the electrode body with the insulating holder and an electrolyte; and
a sealing plate that seals the opening, wherein:
the outer case has a bottom plate part and a plurality of side walls standing from the bottom plate part, and the opening is formed in a position to face the bottom plate part,
the electrode body has a bottom and the bottom of the electrode body faces the bottom plate part of the outer case,
the insulating holder has a plurality of side surface parts respectively facing the plurality of side walls, and a bottom surface part that faces the bottom plate part,
the insulating holder includes a bellow-folded structure,
the bellow-folded structure is formed from the single sheet and comprises a plurality of sheet pieces that are contiguous portions of the single sheet, the bellow-folded structure is a folded structure having a plurality of mountain-folded parts and a plurality of valley-folded parts alternately provided, and each of the plurality of sheet pieces is integrally connected to adjacent sheet pieces along both a corresponding one of the plurality of mountain-folded parts and a corresponding one of the plurality of valley-folded parts, and
the bellow-folded structure is disposed at a location between the bottom of the electrode body and the bottom plate part of the outer case so that the plurality of sheet pieces extend parallel to the bottom plate part.

2. The electricity storage device of claim 1, wherein the plurality of mountain-folded parts in the bellow-folded structure count two or more but not more than eight.

3. The electricity storage device of claim 1, wherein each of the plurality of sheet pieces includes a plurality of holes.

4. The electricity storage device of claim 3, wherein in two sheet pieces of the plurality of sheet pieces, which face each other when the sheet is folded, each of the plurality of holes formed in one of the two sheet pieces faces a portion of the other of the two sheet pieces having no hole.

5. An insulating holder formed by folding a single sheet made of an insulating material, comprising:
a bottom surface part; and
a plurality of side surface parts standing from the bottom surface part, wherein:
the plurality of side surface parts include a pair of wide side surface parts and a pair of narrow side surface parts, each of the pair of narrow side surface parts is smaller than each of the pair of wide side surfaces,
the bottom surface part has a bellow-folded structure, and
the bellow-folded structure is formed from the single sheet and comprises a plurality of sheet pieces that are contiguous portions of the single sheet, the bellow-folded structure is a folded structure having a plurality of mountain-folded parts and a plurality of valley-folded parts alternately provided, and each of the plurality of sheet pieces is integrally connected to adjacent sheet pieces along both a corresponding one of the plurality of mountain-folded parts and a corresponding one of the plurality of valley-folded parts,
the plurality of sheet pieces are disposed parallel to each other,
the plurality of sheet pieces in the bellow-folded structure extend parallel to the bottom surface part, and
a first sheet piece of the plurality of sheet pieces connected to one of the pair of wide side surface parts is parallel to a second sheet piece of the plurality of sheet pieces connected to the other of the pair of wide side surface parts.

6. The electricity storage device of claim 1, wherein each of the plurality of sheet pieces has a surface, each of the surface of the plurality of sheet pieces is folded on top of each other, and each of the surface of the plurality of sheet pieces extends parallel to the bottom plate part.

7. The electricity storage device of claim 5, wherein each of the plurality of sheet pieces has a surface, each of the surface of the plurality of sheet pieces is folded on top of each other, and each of the surface of the plurality of sheet pieces in the bellow-folded structure extends parallel to the bottom plate part.

* * * * *